(12) United States Patent
Webersinke et al.

(10) Patent No.: US 10,409,232 B2
(45) Date of Patent: Sep. 10, 2019

(54) ENGINEERING TOOL AND METHOD FOR PARAMETERIZING A MODEL-BASED PREDICTIVE CONTROLLER

(75) Inventors: Lena Webersinke, Karlsruhe (DE); Bernd-Markus Pfeiffer, Woerth (DE)

(73) Assignee: Siemens Aktiengesellschaft, Munich (DE)

( * ) Notice: Subject to any disclaimer, the term of this patent is extended or adjusted under 35 U.S.C. 154(b) by 1224 days.

(21) Appl. No.: 13/638,115

(22) PCT Filed: Mar. 29, 2010

(86) PCT No.: PCT/EP2010/054118
§ 371 (c)(1),
(2), (4) Date: Dec. 18, 2012

(87) PCT Pub. No.: WO2011/120552
PCT Pub. Date: Oct. 6, 2011

(65) Prior Publication Data
US 2015/0309486 A1  Oct. 29, 2015

(51) Int. Cl.
*G05B 13/04* (2006.01)

(52) U.S. Cl.
CPC .................. *G05B 13/048* (2013.01)

(58) Field of Classification Search
CPC .............................. G05B 19/02; G05B 13/048
USPC ........................................................ 700/29
See application file for complete search history.

(56) References Cited

U.S. PATENT DOCUMENTS

| | | | |
|---|---|---|---|
| 6,278,899 B1 * | 8/2001 | Piche et al. ..................... | 700/44 |
| 6,381,504 B1 * | 4/2002 | Havener et al. ................ | 700/44 |
| 6,501,998 B1 * | 12/2002 | Pfeiffer ................ | G05B 13/042 |
| | | | 700/31 |
| 8,751,866 B2 * | 6/2014 | Gooding ............. | G06F 11/0724 |
| | | | 709/223 |

(Continued)

OTHER PUBLICATIONS

SIMATIC PCS 7 APC-Portfolio White Paper Wie verbessern Sie die Performance Ihrer Anlage mit Hilfe der passenden Funktionen aus dem SIMATIC PCS 7 APC-Portfolio.

(Continued)

*Primary Examiner* — Kenneth M Lo
*Assistant Examiner* — Michael J Huntley
(74) *Attorney, Agent, or Firm* — Cozen O'Connor

(57) ABSTRACT

An engineering tool and a method for parameterizing a model-based predictive controller for controlling a process-engineering process. A quality determining module for determining the quality of the model, which contains the model-based predictive controller for the behavior of the process-engineering process that is to be controlled, uses measurement data to ascertain errors in various model parameters as model errors. The weighting factors used to weight manipulated variable changes in a quality criterion are determined by a weighting factor module such that manipulated variable changes of a model-based predictive controller designed taking into account model errors are the same as those of a predictive controller designed based on the assumption of an error-free model. This advantageously results in good performance with simultaneously adequate stability of the controller. In addition, the parameterization of the controller which the user needs to perform requires no control-engineering know-how or the performance of complex trials.

5 Claims, 5 Drawing Sheets

(56) References Cited

U.S. PATENT DOCUMENTS

| | | | | |
|---|---|---|---|---|
| 2002/0005725 | A1* | 1/2002 | Scott | 324/637 |
| 2003/0157302 | A1* | 8/2003 | Handwerker | 428/178 |
| 2005/0154477 | A1* | 7/2005 | Martin et al. | 700/37 |
| 2006/0015309 | A1* | 1/2006 | Weiss | G06Q 10/06 703/6 |
| 2006/0074501 | A1* | 4/2006 | Hartman et al. | 700/29 |
| 2007/0062143 | A1* | 3/2007 | Noushad | 52/426 |
| 2007/0078529 | A1* | 4/2007 | Thiele | G05B 13/048 700/29 |
| 2007/0144653 | A1* | 6/2007 | Padilla et al. | 156/64 |
| 2007/0145041 | A1* | 6/2007 | Shim | 219/635 |
| 2007/0244575 | A1* | 10/2007 | Wojsznis | G05B 17/02 700/38 |
| 2008/0221815 | A1* | 9/2008 | Trost et al. | 702/81 |
| 2008/0308210 | A1* | 12/2008 | Keller et al. | 156/64 |
| 2009/0248175 | A1* | 10/2009 | Eguchi | G05B 13/048 700/30 |
| 2010/0191361 | A1* | 7/2010 | McCready | G05B 13/048 700/104 |
| 2010/0232877 | A1* | 9/2010 | Sanvik et al. | 404/77 |
| 2011/0031238 | A1* | 2/2011 | Segawa et al. | 219/702 |
| 2013/0343734 | A1* | 12/2013 | Dock et al. | 392/441 |
| 2017/0328179 | A1* | 11/2017 | Dykstra | E21B 43/26 |

OTHER PUBLICATIONS

Shridhar et al., "A Tuning Strategy for Unconstrained SISO Model Predictive Control", Ind. Eng. Chem. Res., 1997, 36, pp. 729-746.
Shridhar et al., "A Tuning Strategy for Unconstrained Multivariable Model Predictive Control", Ind. Eng. Chem. Res., 1998, 37, pp. 4003-4016.
Wojsznis et al., "Developing Confidence Intervals for Process Model Validation"; Jan. 1, 2002; http://www.eassydeltay.com/repository/isa/wwam.pdf; introduction; the whole document.
Wojsznis et al., "Practical Approach to Tuning MPC"; introduction; the whole document; pp. 149-162.

\* cited by examiner

ENGINEERING TOOL AND METHOD FOR PARAMETERIZING A MODEL-BASED PREDICTIVE CONTROLLER

CROSS-REFERENCE TO RELATED APPLICATIONS

This is a U.S. national stage of application No. PCT/EP2010/054118 filed 29 Mar. 2010.

BACKGROUND OF THE INVENTION

1. Field of the Invention

The invention relates to an engineering tool and method for parameterizing a model-based predictive controller.

2. Description of the Related Art

Model-based predictive controllers (Model Predictive Control, MPC) are frequently used to control multivariable systems in process automation. In this case, the advantages of the MPC are not only the handling of coupled multivariable systems but also the consideration of measurable disturbances in its model-based calculation of the necessary manipulated variables. By way of example, the MPC differs from a PID controller not only in that it calculates its manipulated variables based on current measurement data but also in that it includes the expected process response itself therein and takes account not only of the current deviations in controlled variables from setpoint values but also of the future values situated within a horizon. For further details of model-based predicted controllers, reference is made to the White Paper published by Siemens AG "Wie verbessern Sie the Performance Ihrer Anlage mit Hilfe der passenden Funktionen aus dem SIMATIC PCS 7 APC Portfolio?" [How do you improve the performance of your installation using the appropriate functions from the SIMATIC PCS 7 APC portfolio?], October 2008.

This White Paper furthermore describes an engineering tool that assists the user in designing the model-based predictive controller and is called an MPC configurator. The manner of operation of the known MPC configurator is explained briefly with reference to FIG. 1. In a step 1, an operator initially selects suitable measurement data from the process engineering process to be controlled. These measurement data are read in in a step 2, and the measurement data are used in a step 3 to identify a model which, in the case of a multivariable controller, comprises a plurality of transfer function elements. The identified model is visually assessed by the operator in a step 4. In a step 5, the operator prescribes the weighting factors for a quality criterion, the minimization of which is the aim of the model-based predictive controller. In the quality criterion, controlled variables are weighted in accordance with the weighting factors, and manipulated variable changes are penalized. In a step 6, the quality criterion forms a basis for calculating the model-based predictive controller, the function of which is validated in a step 7 and assessed by the operator in a step 8. If performance is adequate, the controller parameters obtained are exported from the engineering tool in a step 9 and are loaded into a controller module of an automation appliance that is used to automate the process engineering installation. The input of weighting factors that is performed in step 5 is frequently a problem for operators, because it is not always easy to make the choice of setting, and it often results in several "trial and error" experiments. This is the case particularly with complex statements of the problem. Such test passes are time-consuming and costly in installations in the process industry. As a result, users are therefore frequently deterred from using an MPC. For this reason, there will be particular advantage in an engineering tool that can be used not only to identify the model and to calculate the controller but also to determine the weighting factors automatically.

The known model-based multivariable controller calculates its manipulated variables based on the minimization of the following measure of quality:

$$J=(\underline{w}-\underline{y})^T\underline{R}(\underline{w}-\underline{y})+\Delta\underline{u}^T\underline{Q}\Delta\underline{u}.$$

In this case, the deviation in the controlled variables $\underline{y}$ from the setpoint variables $\underline{w}$ is penalized with the diagonal matrix $\underline{R}$, and the manipulated variable changes are penalized with the diagonal matrix $\underline{Q}$. The diagonal elements of the matrix $\underline{R}$ determine the priority of the different controlled variables among one another, while the diagonal elements of the matrix $\underline{Q}$ prescribe the level of the control intervention for the various manipulated channels. In this context, a small $q_{ii}$ allows a high level of manipulation intervention and a large $q_{ii}$ allows a low level of manipulation intervention.

The minimization of this measure of quality results in the following controller equation for the calculation of the manipulated variable changes:

$$\Delta\underline{u}=\underline{C}(\underline{w}-\underline{f}) \text{ with } \underline{C}(\underline{G}^T\underline{R}\underline{G}+\underline{Q})^{-1}\underline{G}^T\underline{R}.$$

In this case, $\underline{f}$ represents the free movements in the process and $\underline{G}$ represents the matrix of the step response coefficients from the process model.

The article by Wojsznis, W., Gudaz, J., Mehta, A., Blevnis, T., "Practical Approach to Tuning MPC", ISA Transactions 2003 and the article by Wojsznis, W., Mehta, A., "Developing Confidence Intervals for Process Model Validation", ISA Conference 2002, already disclose an engineering tool for parameterizing a model-based predictive controller, which engineering tool has means for determining the quality of the model that the model-based predictive controller contains for the response of the process to be controlled, and which engineering tool automatically determines weighting factors that are used to weight manipulated variable changes in a quality criterion, the minimization of which is the design aim of the controller. In order to determine the quality of the model, singular value breakdown of the measurement data is performed therein. This is used to determine the standard deviations in the model parameters on the assumption of a normal distribution. By virtue of the definition of confidence intervals, this results in an uncertainty band for the step response. For the parameterization of the manipulated variable penalizations, an empirical study has been performed, which results in a calculation formula for the weighting factors that contains parameters and the deviations therein from PT1Tt models that are used for modeling the process response. Disadvantageously, this involves an empirical solution to the determination of the weighting factors, which consequently have no general validity.

SUMMARY OF THE INVENTION

It is therefore an object of the invention to provide an engineering tool that allows improved automatic calculation of meaningful weighting factors which are used to weight manipulated variable changes in a quality criterion, as a result of that the robustness of a model-based predictive controller parameterized using the engineering tool is improved.

This and other objects and advantages are achieved in accordance with the invention by providing a method and engineering tool in which stipulating weighting factors in a quality criterion, the minimization of which is the aim of the model-based predicted controller, advantageously does not require any control-oriented know-how from an operator. This significantly increases the usability of model-based predictive controllers and hence also the spread thereof. The aggressiveness and hence also robustness of the controller are influenced by the penalization of the manipulated variable changes. If the controller is based on a high-precision model, a high level of manipulation intervention can be effected for a high level of performance from the controller. If, by contrast, there are high levels of model uncertainty and hence the calculated manipulation interventions of the controller are not always exactly correct, a high level of manipulation intervention would result in fluctuation in the course of the manipulated variables or even in instability in the process. To ensure the stability and performance of the control loop, the manipulation intervention is therefore reduced. This is accomplished by raising the weighting factors.

In comparison with the weighting factors being prescribed by an operator, the novel engineering tool has the advantage that it is possible to dispense with complex test series and hence a significant time and cost saving is accomplished. The automatic determination of the weighting factors on the basis of an analytical approach usually delivers better results than manual parameterization of the quality criterion by a specialist expert.

In one particularly advantageous refinement of the engineering tool, the means for determining the quality of the model are designed to take manipulated variable step changes in measurement data which are recorded from the process engineering process to be controlled and to connect corresponding manipulated variable step changes to the model which also uses the model-based controller for simulating the process and to compare the step responses of the process with the respective corresponding step responses of the transfer function elements from the process model. For evaluation of the errors obtained in this manner, the transfer function elements from the model of the controller are approximated by PT1Tt models. This error examination advantageously corresponds to a detailed graphical model analysis, which is easy to understand because it corresponds to an examination with the trained eye. The determination of the quality of the model is therefore comprehensible to the user and very easy to reproduce. This overcomes a further difficulty in the employment and use of an MPC, i.e., the identification of a suitable model. If this were not successful with the necessary precision, it would result in considerable losses in the performance of the control loop and even in stability problems in the case of significant errors. The robustness of the controller plays a substantial part in the use of the MPC. In this context, it means that particular properties, such as stability and performance, are robust in the face of model errors. The consideration of robustness as early as during the design of the MPC using the engineering tool is therefore a great advantage for successful use of the MPC.

In a further advantageous embodiment of the engineering tool, the automatically determined weighting factors are not used directly for the controller design but rather can be altered beforehand by an operator using an operator control appliance to which they are output. The operator therefore has the opportunity to apply his empirical knowledge in this step of the engineering process too.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and also refinements and advantages are explained in more detail below with reference to FIGS. 2 to 6, which show an exemplary embodiment of the invention and in which.

DETAILED DESCRIPTION OF THE PREFERRED EMBODIMENTS

Figure 2:
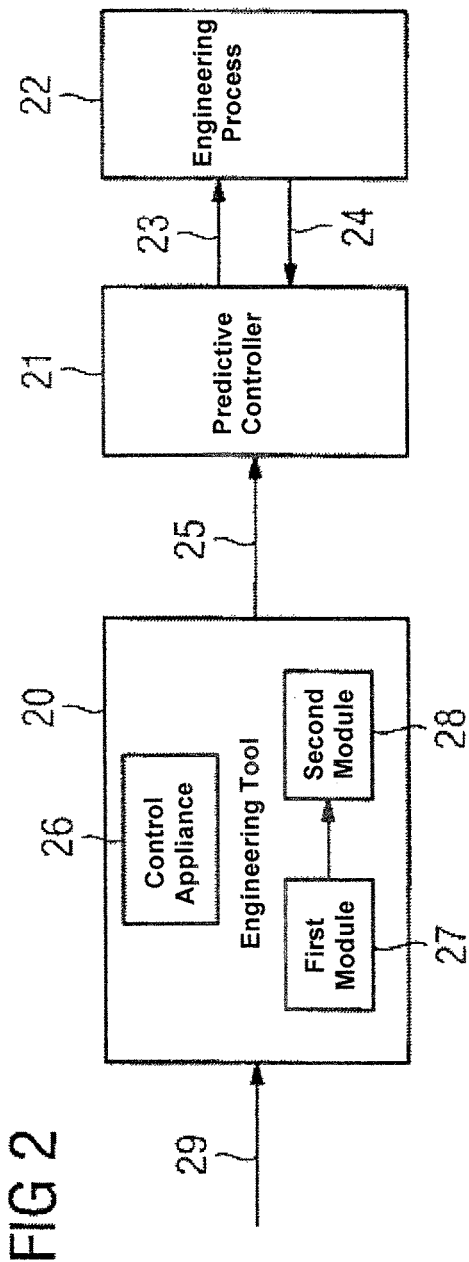
FIG. 2 is a schematic block diagram illustrating a process with a model-based predictive controller and an engineering tool.

FIG. 2 shows an engineering tool 20 together with a model-based predictive controller 21 and an engineering process 22 to be controlled. The engineering process 22 is equipped with actuating elements and measurement transducers. During operation, the predictive controller 21 outputs manipulated variables 23 to the engineering process 22 and captures controlled variables 24 measured using the measurement transducers from the engineering process 22. Matrices 25 for controller equations for the model-based predictive controller 21 are set using the engineering tool 20, which calculates them largely automatically. That is, control-oriented know-how by an operator can largely be dispensed with. To allow an operator's empirical knowledge to be nevertheless included in the calculation, the engineering tool 20 is equipped with an operator control appliance 26. Furthermore, a first module 27 for determining the quality of an identified process model and a second module 28 for determining weighting factors, which are used to weight manipulated variable changes in a quality criterion, the minimization of which is the design aim of the model-based predictive controller 21, are parts of the engineering tool 20. The first and second modules 27 and 28 are implemented by software modules of the engineering software for the engineering tool 20. To identify the process model and to determine the quality thereof, the engineering tool 20 uses measurement data 29 that are read in for this purpose.

The engineering occurs in a plurality of steps.

First Step: Automatic Determination of the Weighting Factors $q_{ii}$ for the Ideal Case in which the Process Model of the Controller Corresponds to the Genuine Process Response and has No Model Errors:

The known approach in the MPC configurator to take account merely of the orders of magnitude of the value ranges for the individual manipulated channels does not always result in the desired aim, because the gain of the transfer function element under consideration exhibits a similarly large influence on the effect of manipulated variable changes. Therefore, suitable parameters need to be determined for each manipulated channel based on the process response.

There are some rules of thumb and appropriate literature for the choice of the parameters for the MPC. The algorithm involved in this concept comes from the publications by Shridhar, R., Cooper, D. J., "A Tuning Strategy for Unconstrained SISO Model Predictive Control", Ind. Eng. Chem. Res., vol. 36, pages 729-746, 1997 (SISO case) and "A Tuning Strategy for Unconstrained Multivariable Model predictive Control", Ind. Eng. Chem. Res., vol. 37, pages 4003-4016, 1998 (MIMO case), the content of which is incorporated by reference in its entirety. The analytical calculations derived in that case arise from the aim of achieving good performance and moderate manipulated variable intervention. For this, the approach chosen was that of projecting the condition number of the matrix to be inverted in the controller equation onto a target value. The condition number is the ratio of the largest to the smallest singular value in the matrix. The higher the condition number, the more difficult it is to invert the matrix.

This condition number describes the influence of prediction errors on the calculated manipulated variable changes. For multiple-input multiple-output (MIMO) systems, the analytical calculation is therefore obtained in which the individual Q values within a manipulated variable channel are summed for all controlled variables y.

$$Q = \sum_y \frac{n_c}{C_{ond}} \left( RK^2 \left( n_p - \left(\frac{\tau}{T} + 1\right) - \frac{3T_d}{2T} + 2 - \frac{n_c - 1}{2} \right) \right),$$

with control horizon $n_c$, prediction horizon $n_p$, controlled variable weighting R, sampling time T, condition number $C_{ond}$, gain K, dead time $\tau$ and time constant $T_d$.

Second Step: Determination of the Model Quality:

In the next step, it is necessary to estimate the model quality or the model uncertainties for the identified model. To this end, the data recorded by the user, which contain manipulated variable step changes, are interpreted as step responses. By connecting the same manipulated variable step changes to the identified transfer function elements, it is also possible to generate step responses of the simulation data for the step responses of the measurement data. A comparison of the respective step responses in terms of amplitude, time delay and rise response provides a statement about the model quality. In order to be able to evaluate this precisely, the models generated by the MPC configurator are approximated using PT1Tt models (first-order delay with dead time):

$$g_{ij}(s) = \frac{K}{1 + T_d s} e^{-\tau s}.$$

Figure 3:
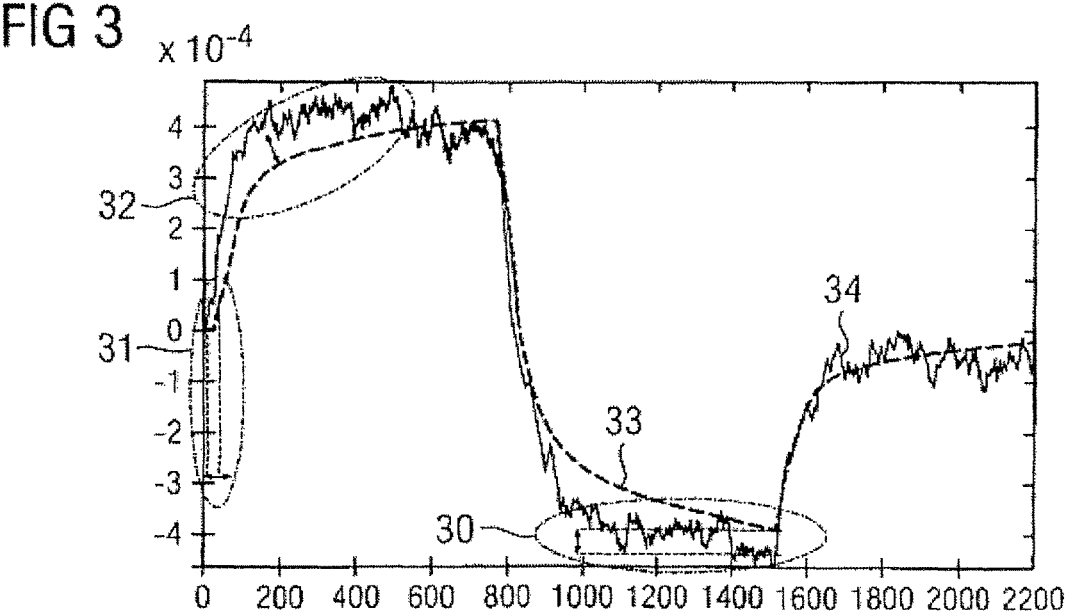
FIG. 3 is a graphical plot illustrating the principle of the determination of the model quality.

In the timing chart shown in FIG. 3, the simulation data are shown by a profile 33 and the measurement data are shown in a profile 34.

On the basis of the error definition illustrated in FIG. 3, a deviation 30 in the amplitude therefore corresponds to a delta in the gain factor K, a deviation 31 in the time delay corresponds to different dead times $\tau$ and a difference 32 in the rise response corresponds to various time constants $T_d$. These fluctuations in the parameters can be attributed to fluctuations in the step responses.

Third Step: Determination of the Weighting Factors $q_{ii}$ for a Robust Response.

In the next step, the model quality or the model uncertainties can be used to infer the required minimum values for the manipulated variable penalization $q_{ii}$. This is accomplished by choosing the novel approach of matching the level of the manipulated variable intervention in the "worst-case" scenario (in the case of a maximum error, which causes the least favorable response from the controller) to the level in the idea case.

Figure 1:
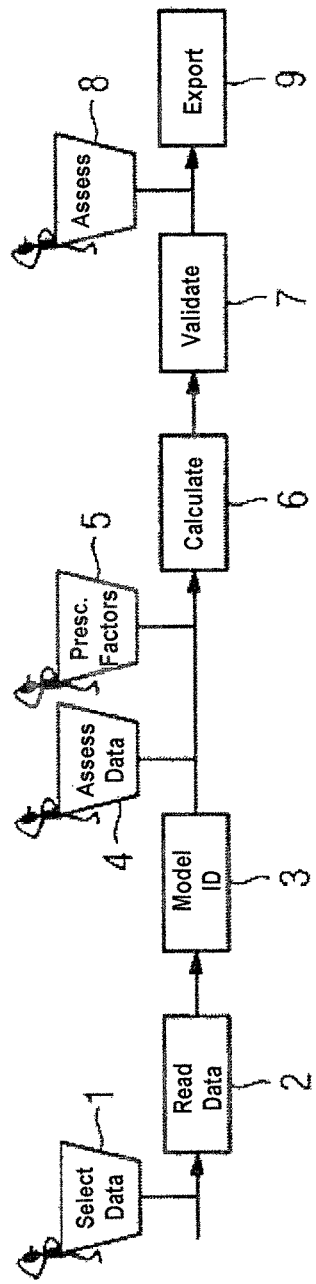
FIG. 1 is a flowchart illustrating the functions of a conventional MPC configurator.

In order to propose suitable Q values and to also take account of the robustness, the already existing MPC configurator explained with reference to FIG. 1 is expanded.

Figure 4:
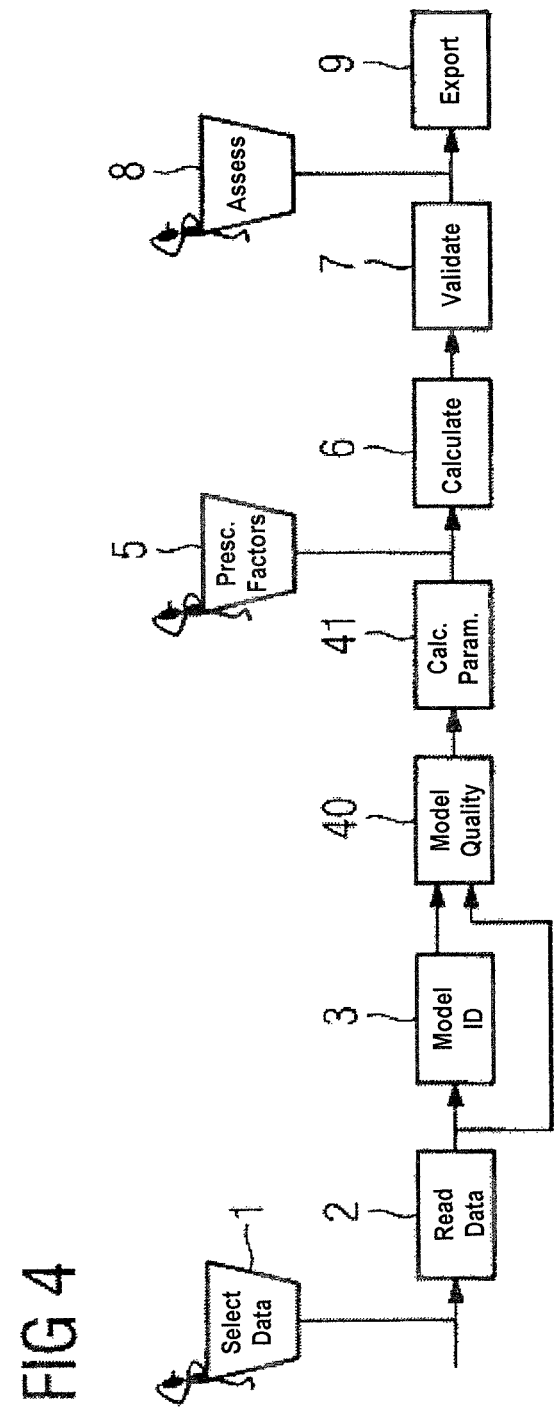
FIG. 4 is a flowchart illustrating functions of the engineering tool in accordance with the invention.

The functions of the novel engineering tool are illustrated in FIG. 4. In FIGS. 1 and 4, functional modules which correspond to one another have been provided with the same reference symbols. In the novel engineering tool, the model identification 3 is followed by the performance of detailed determination 40 of the model quality and also calculation 41 of a parameterization proposal for the weighting of the manipulated variable changes. The proposal obtained in this manner for parameterization can be modified by the user as desired by using a function 5 prior to the controller calculation 6 to include his own experience.

The text below explains in more detail once again the function 40 in FIG. 4, i.e., the determination of the model quality. For an estimation of the quality of the model identified by the engineering tool, the errors in the model parameters from the finite step response (FSR) model are intended to be estimated based on first-order models with dead time. In this case, the estimation is effected by comparing the measurement data with the simulated results from the model of the controller and is divided into errors in the gain, in the dead time and in the time constant. For this, as already described above, the recorded step changes and step responses in the measurement data are compared with appropriate simulation data. For this method to be very successful, suitable operator control ensures that the data recorded for the identification satisfy the following conditions:

the entire dynamic range is captured, the excitation signal comprises only step changes and is otherwise constant, and the excitation by the various manipulated and disturbing variables is effected only in succession and not simultaneously.

In order to ensure that these conditions are satisfied, automatic excitation generation can be provided.

For every yu channel (every transfer function element), it is necessary for a model in the form $$y_i = \sum_j \frac{K_{ij}}{1 + T_{d,ij} s} e^{-\tau_{ij} s} u_j$$

to be found. This is possible when the individual manipulated channels are excited in succession by step changes.

In a first step, this requires the FSR models identified by the MPC configurator to be approximated to the desired form. To this end, the simulated results from these models need to be reindentified in combination with the recorded series of manipulated variable step changes using the "prediction error" method. A correlation coefficient shows how well this approximation reproduces the genuine simulation model.

In the next step, the recorded measurement data and also the simulation data generated using the models identified in the MCP configurator are evaluated in terms of the three characteristics dead time, process gain and time constant, and the deviation therein is ascertained.

Dead time $\tau_{ij}$: the time offset between the step change default in the manipulated variable up until a recognizable reaction in the controlled variable describes the dead time. To this end, the gradient of the controlled variables after a step change in a manipulated variable is examined.

Process gain $K_{ij}$: Difference between the two steady states of the controlled variable, referenced to the step size in the manipulated variable, provides the process gain. To this end, the maximum and minimum controlled variable values within the steady state are evaluated and compared with one another.

Time constant $T_{d,ij}$: The time constant is determined by using the approximated integral between the y curve, the time at which the dead time is passed and the horizontal straight line through the final point of the step response. The approximation is made by summing the area contents of the rectangles situated in this region.

This evaluation is performed both for the measurement data and for the simulation data, and the maximum deviation between the two is calculated therefrom. In order to determine the parameter fluctuations, this maximum deviation is assumed for a possible change in both directions starting from the value of the approximated model.

In order to visualize the results attained, both the step responses of the approximated PT1Tt model and the step responses of those PT1Tt models with the largest parameter deviations are plotted together.

In order to parameterize the model error analysis, a plurality of threshold values and also filter parameters (e.g., mean of the n maximum gains during the steady state is used as a maximum value) are available to identify particular features and to reduce the influence of measurement data noise.

Calculation of a lower limit for the penalization of the manipulated variable change:

The calculation of the manipulated variable penalization, subsequently called Q values, is divided into two steps. First of all, it is necessary to determine the values for the ideal case (without model errors) to subsequently calculate the robust parameterization therefrom.

Calculation of the Q values for the ideal case:

The calculation is performed in accordance with Shridhar, R., Cooper, D. J., "A Tuning Strategy for Unconstrained Multivariable Model Predictive Control", Ind. Eg. Chem. Res., vol. 37, pages 4003-4016, 1998, as already described above for the first step, i.e., in the case of automatic determination of the weighting factors $q_{ii}$ for the ideal case.

During the derivation of the formula for the ideal case, it is assumed for simplification that the prediction horizon is chosen to be as large as possible and the sampling time of the controller is chosen to be as short as possible (ideal conditions for the controller). In addition, the Q values are approximated downward to simplify the formula. Since, in the present case, it is not the setting for a totally overshoot-free guidance response that is being sought (this would render online parameterization using the setpoint value input filters and hence the decision between performance and dynamics by the user no longer possible), this downward estimation is valid.

Analytical formula for calculating the robust parameterization:

In order to guarantee a robust response, it is necessary to convert the performance-based Q calculated according to Shridhar in the previous section to a robust Q based on the analytical model uncertainties. This conversion is advantageously as analytical as possible and has only a slightly empirical nature. To this end, the following approach is chosen, which will be explained from two different perspectives. The controller equation for an ideal process without model uncertainties is obtained as $$\Delta \underline{u} = (\underline{G}^T R \underline{G} + \underline{Q})^{-1} \underline{G}^T R(\underline{w} - \underline{f}).$$

In this case, the matrix $\underline{G}$ comprises the step response coefficients of the process model. If there is now a real process with arbitrary errors in the model parameters, this always results in additive displacement of the step response coefficients. Hence, the controller equation for a real process is obtained as $$\Delta \underline{u} = ((\underline{G} + \Delta \underline{G})^T R(\underline{G} + \Delta \underline{G}) + \hat{\underline{Q}})^{-1} \underline{R}(\underline{w} - \underline{f}).$$

In this case, the genuine process response is obtained from the addition of the step response coefficients from the process model $\underline{G}$ used in the controller plus an error $\Delta \underline{G}$. The aim is now to keep the magnitude of the manipulated variable changes the same as that when the ideal process model is used, despite the model uncertainties. If the uncertainties mean that excessively strong or weak control intervention would arise, this could otherwise result—in a harmless case—in losses in performance or—more seriously—in stability. The operation of equation results in the term $$((\underline{G}+\Delta\underline{G})^T R(\underline{G}+\Delta\underline{G}) + \hat{\underline{Q}})^{-1}(\underline{G}+\Delta\underline{G})^{T^1} = (\underline{G}^T R \underline{G} + \underline{Q})^{-1} \underline{G}^T.$$

Expansion on both sides of the equation to allow reshaping results in $$((\underline{G}+\Delta\underline{G})^T R(\underline{G}+\Delta\underline{G})+\hat{\underline{Q}})^{-1}(\underline{G}+\Delta\underline{G})^T \underline{G}^1 = (\underline{G}^T R \underline{G}+\underline{Q})^{-1} \underline{G}^T \underline{G}.$$

Resolution based on the desired variable Q results in $$\hat{\underline{Q}} = \underline{G}^T \underline{G}((\underline{G}+\Delta\underline{G})\underline{G})^{-1}((\underline{G}+\Delta\underline{G})^T R(\underline{G}+\Delta\underline{G})+\underline{Q}) - \underline{G}^T R \underline{G}$$

for the calculation of the robust parameterization of the manipulated variable weighting on the basis of the model uncertainties $\Delta G$ and the Q values for good performance $\underline{Q}$.

Closer consideration of this formula shows that there are two possible model errors to be taken into account: positive and negative. Similarly, it is possible for the robust Q value to be lower than the value for good performance. This means that there are also "good-natured" model errors which increase robustness. For the use of this analytical formula, it is therefore important to know which errors have a positive effect and which have a negative effect on the robustness of the system. This will be evaluated in the next section. First of all, however, the aim is to shed light on the derivation cited in the present case from a different aspect.

Assuming that the controller has the model available which, in terms of its model errors, demonstrates the most negative effects on the control loop (in terms of performance and stability), the derivation will now be considered again. This "worst-case" model corresponds to $(\underline{G}+\Delta\underline{G})$ in the derivation. It is now the aim to displace the step response from this controller by a parameterization of the Q values such that the step response corresponds to the ideal step response of the controller in light of the genuine $\underline{G}$. This is likewise successful by weighting the two terms and resolving them on the basis on the desired new Q values $\hat{Q}$.

For use in a new MPC configurator, the above equation still needs to be modified slightly. The Q values calculated in this case can alternatively be used as proposals for the user and may not be included directly in the calculation of the controller. If the above equation were used directly in this MIMO notation, the resulting matrix $\hat{Q}$ would be of the dimension $[n_u*n_p \times n_u*n_p]$. A precise calculation formula for converting this non-diagonal-like matrix with elements that change over the control horizon into the representation of a diagonal matrix having the dimension $[n_u \times n_u]$ that is known and clear to the user is not available. For this reason, the above equation needs to be considered separately for each transfer function element. Similarly, the step response coefficients are considered not in each sampling step of the model but rather only in each sampling step of the controller $T_c$ and also only within the prediction horizon $n_p$. Hence, the calculation of the robust Q values for the diagonal matrix results in $$\hat{Q}(i, i) = \sum_{j=1}^{n_y} \left[ G_{1:T_C \cdot n_p}(j, i)^T G_{1:T_C \cdot n_p}(j, i) \right.$$
$$\left( (G_{1:T_C \cdot n_p}(j, i) + \Delta G_{1:T_C \cdot n_p}(j, i)) G_{1:T_C \cdot n_p}(j, i) \right)^{-1} \cdot$$
$$\left( (G_{1:T_C \cdot n_p}(j, i) + \Delta G_{1:T_C \cdot n_p}(j, i))^T R(j, j) \right.$$
$$\left. (G_{1:T_C \cdot n_p}(j, i) + \Delta G_{1:T_C \cdot n_p}(j, i)) + Q(i, i) - \right.$$
$$\left. G_{1:T_C \cdot n_p}(j, i)^T R(j, j) G_{1:T_C \cdot n_p}(j, i) \right]$$

In this case, Q(j,i) are the individual summands of the formula for the ideal Q according to Shridhar, i.e. they relate to a single transfer function element G(j,i).

Determination of the "worst-case" situation:

For the "worst-case" situation, the maximum deviation from the ideal step response is of interest. This means that also only the maximum deviations in gain, dead time and time constant are relevant. A maximum displacement in the step response in the event of a negative error in the gain (the gain of the controller model is lower than that of the genuine process) is obtained for a simultaneous positive error in the dead time (the dead time of the model is greater than that of the genuine process) and in the time constant (the time constant of the model is greater than that of the genuine process). Accordingly, the maximum displacement in the step response for a positive error in the gain is obtained for a simultaneous negative error in the dead time and in the time constant.

Possible "worst-case" scenarios that remain are therefore now only the maximum and minimum step responses. For selection of the step response for the most negative influence on the control loop, a thought experiment is subsequently performed for each of the three erroneous parameters.

Gain

Assumption: The gain of the controller model is too high.
The controller assumes a greater influence for its manipulated variable change than actually occurs in the genuine process. It is therefore more likely to prescribe a smaller manipulated variable change, which corresponds to a more robust response.

Assumption: The gain of the controller model is too low.
The controller assumes a smaller influence for its manipulated variable change than actually occurs in the genuine process.

The controller therefore prescribes excessive manipulated variable changes, which can possibly result in vibrations.

Dead Time

Assumption: The dead time of the controller model is too short.
The controller assumes a faster influence for its manipulated variable change than actually occurs in the genuine process. The absence of such an early reaction will be noticed as a result of the return of the actual values, as a result of which slight corrections can be performed. However, this error nevertheless has a disturbing effect.

Assumption: The dead time of the controller model is too long.
The controller assumes a later influence for its manipulated variable change than will actually occur in the genuine process. Once the error is noticed, the process responsa has already changed and correction is barely or even no longer possible. Hence, this type of error should be considered to be even more serious than excessively short dead times.

Time Constant

Assumption: The time constant of the controller model is too short.
The controller assumes a faster transient process than actually occurs in the genuine process. Therefore, it will output manipulated variable changes for a relatively short time, i.e., smaller manipulated variable changes on average over time. This is more likely to result in an improvement in robustness.

Assumption: The time constant of the controller model is too long.
The controller assumes a slower transient process than actually occurs in the genuine process. Therefore, it will output manipulated variable changes for a relatively long time, i.e., larger manipulated variable changes on average over time. This results in an impairment of robustness.

The thoughts sensed here have been confirmed using an exemplary process (distillation column). They mean that the "worst-case" scenario is brought about by an excessively small step response in the controller model, i.e., by a gain that is assumed to be too low and a dead time and time constant that are assumed to be too long.

It should be noted that in the case of heavily coupled models and unfavorable start parameterization for the Q values, for example, the same correlation certainly applies in principle but the heavy influence between the individual transfer function elements can result in a partly contrasting response. Thus, although a severe error in a channel may result in impairment of the robustness at that point, this may cause a simultaneous improvement in robustness in another channel. This is not intended to be understood to be a restriction of the method in accordance with the invention, however, because an increase in the Q values always results in a more robust response in principle. Heavy coupling naturally cannot be overturned by this disclosed method, but suitable parameterization therefor can be found.

It is similarly found (as already mentioned previously with reference to the analytical formula) that for certain combinations of errors and parameterization of Q the robustness increases. For such systems, the higher Q value for the performance (ideal case) will then be retained (so as not to confuse the user), however.

In order now to substantiate the interpretation of the analytical formula, it is briefly summarized once again. It is assumed that the controller assumes an excessively small step response (from the process) based on the maximum model errors. Therefore, the step response of the controller model is displaced in the direction of ideal step response by the Q parameterization in order to obtain a more robust response.

Figure 5:
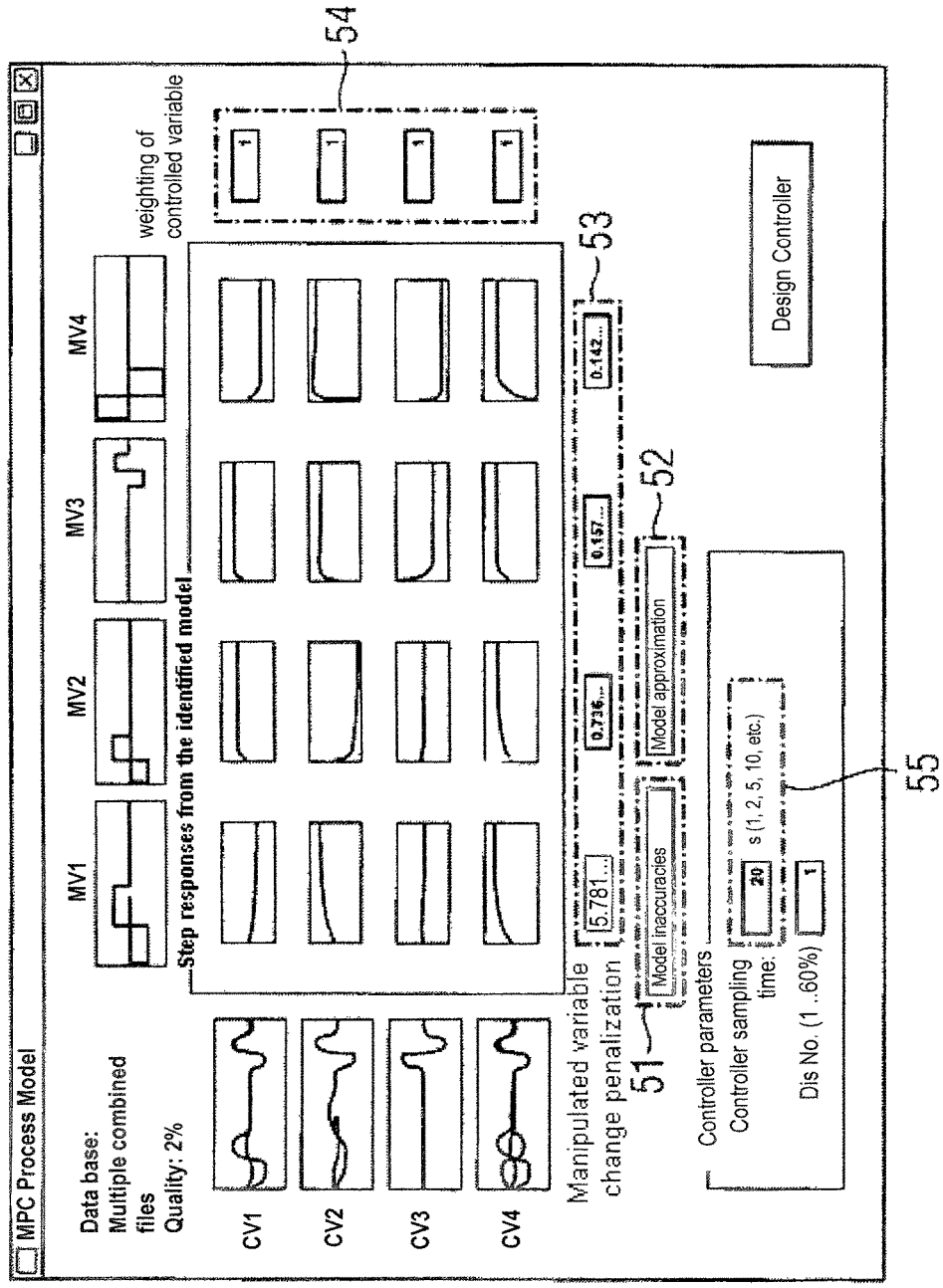
FIG. 5 is a schematic block diagram of a user interface of the engineering tool in accordance with the invention.
Figure 6:
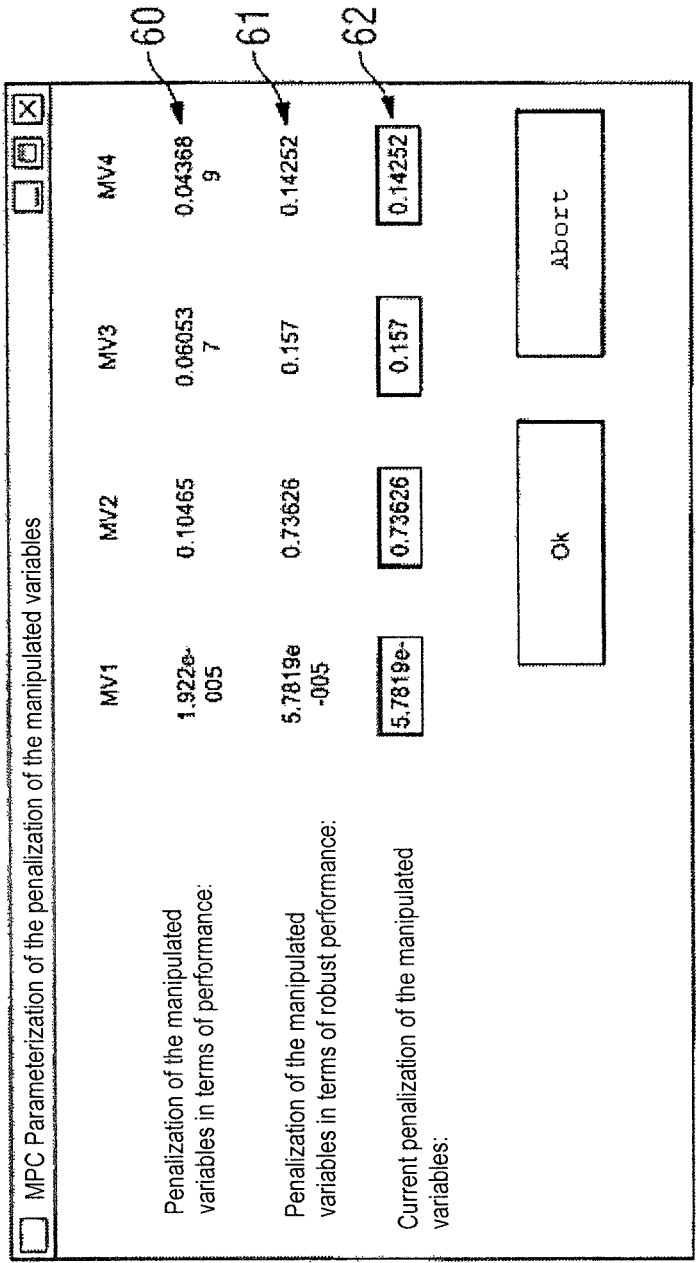
FIG. 6 is a schematic block diagram of a user interface for inputting changes to proposed weighting factors in accordance with the invention.

The novel engineering tool has been implemented as a prototype as an expansion of the known MPC configurator. The automatic determination of the weighting factors is called automatically when identification has occurred, and the results thereof are output to the operator in an output window on a graphical user interface, said output window being shown in FIG. 5. To this end, the user interface of the known MPC configurator has been expanded by the input/output fields highlighted by frames. The frames are each provided with reference symbols. The two additional buttons in the frames 51 and 52 can be used to display the model uncertainties or the model approximation in the form of PT1Tt models stored in memory of a computer that includes a processor for executing the method in accordance with the invention. The previous input windows in the frame 53 for the weighting factors are now implemented as buttons that display the automatically determined weighting factors. When these buttons are operated, a further window opens, that further window being shown in FIG. 6 and being used to display the calculated weighting factors for the ideal case in the top row 60 and the calculated weighting factors for robust parameterization in the second row 61. The third row 62 can be used by the operator to input alternative values for the weighting factors, based on his experience. Here, the completely automatic determination of the weighting factors has the advantage that they are automatically adapted in the event of a change in the controlled variable weighting or the sampling time of the controller. Appropriate inputs in the fields in frames 54 and 55 in FIG. 5 are therefore automatically included in the determination of the weighting factors.

The advantageous properties of the novel engineering tool will be summarized once again below. One distinct advantage is the ease of understanding of the determination of the quality of the model. Unlike in the publications by Wojsznis already cited above, no complex mathematical calculations are required for this, but rather the trained eye of the experienced operator is simulated, which leads to very easily reproducible results. In addition, no empirical calculation of the Q values occurs, because it is generally impossible to cover all relevant cases with empirical studies, and the empirical approach can therefore lead to miscalculations. Instead, the engineering tool described here involves an analytical correlation being produced which is valid for all instances of application.

In a practical comparison, a model-based predictive controller which has been set manually using the known MPC configurator was compared for a distillation column and for a polymerization reactor with a controller which has been parameterized using the novel engineering tool. This revealed that the basic dynamics of the novel controller are somewhat slower, and said controller exhibits a slightly delayed rise following a setpoint value step change. Nevertheless, the controlled variable reaches its required target more quickly. The parameterization that has been set in the novel manner can already be used to achieve a good control result that is superior or at least very similar to that of manual parameterization. At the same time, a comparison of the manipulated variables revealed that the controller that has been set using the novel engineering tool engages distinctly more quietly and therefore requires less actuating power. Use of an input filter for the controller that is set in the novel manner could attenuate the dynamics still further according to the requirements of the user.

In the case of the known MPC configurator, there were two serious obstacles to a faster spread of model-based predictive controllers for applications in process automation. The parameterization of the controller that needed to be performed by the user required control-oriented know-how and also often the performance of "trial and error" experiments in simulation and during the genuine process. Similarly, it was difficult to identify models which describe the process response with a high level of quality. However, without consideration of the robustness during the controller design, erroneous models would result in losses in performance and possibly even in stability.

By contrast, the novel engineering tool is used to determine the model uncertainties of the identified model on the basis of an analysis of measurement and simulation data. To this end, a distinction is drawn between errors in the gains, the dead times and the time constants. To ensure a good level of robustness for the predictive controller toward model errors, suitable start parameterization for the weighting factors of the manipulated variable penalizations is adapted based on the model uncertainties such that the level of the manipulation intervention corresponds to that in the ideal case, i.e., in the case of an error-free model. On this basis, the model-based predictive controller is now parameterized or the weighting factors determined in this manner are made available to the user as proposals which the user can adapt based on his own empirical knowledge. Hence, it is now possible for the user to obtain good levels of parameterization without specific specialist knowledge and without a large number of test experiments. Hence, the obstacle to entry for the use of a model-based predictive controller has been significantly reduced in comparison with previous engineering tools.

While there have shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

The invention claimed is:

1. An engineering tool for parameterizing a model-based predictive controller for controlling an engineering process, the engineering tool comprising:
   a quality determining module for determining a quality of a model that the model-based predictive controller contains for response of the engineering process to be controlled based on comparisons of respective step responses comprising amplitude, time delay and rise response; and
   a weighting factor module for automatically determining weighting factors used to weight manipulated variable changes in a quality criterion for an ideal case in which the model of the model-based predictive controller corresponds to a genuine process response and has no model errors, the model-based predictive controller being used to minimize said quality criterion, and the determination of the weighting factors being dependent on a respectively determined quality of the model;

wherein the quality determining module for determining the quality of the model is configured to utilize measurement data to ascertain errors in a plurality of model parameters as model errors;

wherein the weighting factor module for automatically determining weighting factors is configured to determine the weighting factors such that, in a model-based predictive controller, the manipulated variable changes which are created taking into account model errors are the same as those of a predictive controller created based on an assumption of an error-free model;

wherein the weighting factors are called automatically when identification has occurred and output to a graphical user interface and displayed in frames as numerical values providing at least one of uncertainty and model approximation indicators; and wherein the model-based predictive controller is operated to control the engineering process based on the weighting factors.

2. The engineering tool as claimed in claim 1, wherein the quality determining module for determining the quality of the model is further configured to obtain manipulated variable step changes in measurement data recorded from the engineering process to be controlled and to connect corresponding manipulated variable step changes to the model, and to compare step responses of the engineering process with respective corresponding step responses of transfer function elements from the model and to evaluate former step responses by using approximated PT1Tt models of the transfer function elements.

3. The engineering tool as claimed in claim 1, wherein the weighting factors can be output to an operator control appliance and can be altered by an operator.

4. The engineering tool as claimed in claim 2, wherein the weighting factors can be output to an operator control appliance and can be altered by an operator.

5. A computer implemented method for parameterizing a model-based predictive controller for controlling an engineering process, the method comprising the steps of:

determining, in a processor of a computer, a quality of a model that the model-based predictive controller contains for a response of the engineering process to be controlled based on comparisons of respective step responses comprising amplitude, time delay and rise response;

automatically determining weighting factors for providing weighted manipulated variable changes in a quality criterion for an ideal case in which the model of the model-based predictive controller corresponds to a genuine process response and has no model errors;

minimizing, by the model-based predictive controller, the weighted manipulated variable, determination of the weighting factors being dependent on a respectively determined quality of the model;

ascertaining, based on measurement data, errors in a plurality of model parameters as model errors;

determining the weighting factors such that, in a model-based predictive controller, the manipulated variable changes which are created taking into account the model errors are the same as those of a predictive controller created based on an assumption of an error-free model; and operating the model-based predictive controller to control the engineering process based on the weighting factors;

wherein the weighting factors are called automatically when identification has occurred and output to a graphical user interface and displayed in frames as numerical values providing at least one of uncertainty and model approximation indicators.

* * * * *